Patented Aug. 6, 1940

2,210,396

UNITED STATES PATENT OFFICE 2,210,396

HEXACENE COMPOUNDS

Erich Clar, Herrnskretschen-on-the-Elbe, Germany, assignor to E. I. du Pont de Nemours & Company, Wilmington, Del., a corporation of Delaware No Drawing. Application June 22, 1939, Serial No. 280,449

2 Claims. (Cl. 260—365)

This invention relates to the preparation of new hexacene compounds and more particularly to the preparation of 7,15-dihydroxyhexacene-5,16;8,13 diquinone and its halogen derivatives.

According to Bentley et al., Journal of the Chemical Society, London, 91:415 and 1588 (1907) 1,5-dioxynaphthalene can be condensed with phthalic anhydride to give a dicarboxylic acid. On attempting ring-closure of this body a trioxynaphthacenequinone and/or a sulfoderivative were obtained with the apparent splitting off of one phthalyl group.

It is the object of this invention to provide a process for producing 7,15-dihydroxyhexacene-5,16;8,13-diquinone as a new intermediate for the preparation of new dyestuffs.

I have found that 1,5-dihydroxynaphthalene can be condensed with phthalic anhydride, and its halogen derivatives, and ring-closed in one reaction, by means of anhydrous aluminum chloride, to give the new 7,15-dihydroxyhexacene-5,16;8,13-diquinone of the formula:

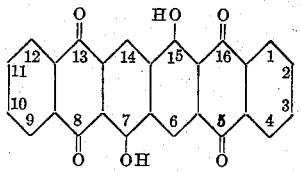

The condensation is preferably carried out in the presence of a solvent such as tetrachloroethane, or in the presence of a flux such as sodium chloride.

The following examples are given to illustrate the preparation of these new dyestuff intermediates. The parts used are by weight.

Example 1

A mixture of 16 parts of 1,5-dihydroxynaphthalene and 40 parts of phthalic anhydride is introduced gradually into a fused mass of 120 parts aluminum chloride and 24 parts sodium chloride at 180° C. under agitation. Agitation is continued for a half-hour at 210° C., and the mass allowed to cool to 110° C. and then poured into dilute hydrochloric acid. This diluted mass is heated to the boiling point, filtered hot and washed with a large quantity of hot water. To purify the crude product it is digested with dilute caustic soda solution, whereupon an insoluble blue sodium salt is formed, while a large amount of the impurities go into solution. This blue sodium salt after isolation by filtration can be further purified by converting it into the soluble leuco-compound with alkaline hydrosulfite, filtering and reoxidising with air. If dilute hydrochloric acid is added to an aqueous suspension of the sodium salt I obtain the 7,15-dihydroxyhexacene-5,16;8,13 - diquinone in reddish-brown flakes. It can be recrystallised out of nitrobenzene, or sublimed in a vacuum. The dihydroxyhexacenequinone dissolves in concentrated sulfuric acid with a bluish green color. It gives a brown vat with alkaline hydrosulfite from which cotton is dyed in brown shades, which on oxidation are converted to the blue color of the sodium salt. On treating the dyeings with acid they are converted to the reddish-brown color on the cloth.

Example 2

A mixture of 8 parts of 1-5-dihydroxynaphthalene, 15 parts of phthalic anhydride, 30 parts of aluminum chloride and 150 parts of tetrachlorethane is heated gradually to 130° C. under agitation and allowed to react until the generation of hydrogen chloride has almost ceased. The mixture is poured into dilute hydrochloric acid and the tetrachlorethane driven off with water vapor. The residue is heated to the boiling point with dilute caustic soda solution and filtered. The insoluble sodium salt is thus obtained which may be further treated as described in Example 1.

In the place of phthalic anhydride the mono, di, tri or tetra halogen phthalic anhydrides such as the chloro, and bromo derivatives may be substituted to give the corresponding halogen dihydroxy hexacenediquinones.

I claim:

1. The dihydroxyhexacenediquinones of the general formula:

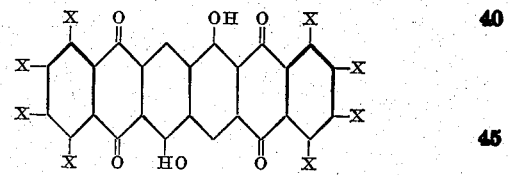

in which the X's stand for a substituent of the class consisting of hydrogen and halogen.

2. The 7,15-dihydroxyhexacene-5,16;8,13 - diquinone.

ERICH CLAR.